US 11,481,451 B2

(12) United States Patent
Yazdi et al.

(10) Patent No.: US 11,481,451 B2
(45) Date of Patent: Oct. 25, 2022

(54) METADATA DRIVEN COMBINED REAL-TIME AND BATCH DATA INGESTION FRAMEWORK WITH REAL-TIME MULTI-VIEW GENERATION

(71) Applicant: JPMorgan Chase Bank, N.A., New York, NY (US)

(72) Inventors: Matthew Yazdi, Scarsdale, NY (US); Manish Doshi, Basking Ridge, NJ (US); Fazil Syed, Brunswick, NJ (US); Smitha Vijayendra, Berkeley Heights, NJ (US); Grant Poladian, North Bergen, NJ (US); Yue Lin, Flushing, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 226 days.

(21) Appl. No.: 16/418,314

(22) Filed: May 21, 2019

(65) Prior Publication Data
US 2020/0372074 A1 Nov. 26, 2020

(51) Int. Cl.
*G06F 16/907* (2019.01)
*G06F 16/9035* (2019.01)

(52) U.S. Cl.
CPC ........ *G06F 16/907* (2019.01); *G06F 16/9035* (2019.01)

(58) Field of Classification Search
CPC .......................... G06F 16/907; G06F 16/9035
See application file for complete search history.

(56) References Cited

U.S. PATENT DOCUMENTS

| | | | |
|---|---|---|---|
| 2009/0138789 A1* | 5/2009 | Tangen ................. | G06F 16/258 715/213 |
| 2016/0188710 A1* | 6/2016 | Dulba Naik .......... | G06F 16/214 707/792 |
| 2019/0026309 A1* | 1/2019 | Roy ....................... | G06F 16/907 |
| 2019/0102438 A1* | 4/2019 | Murray ................. | G06F 40/109 |

* cited by examiner

*Primary Examiner* — Mariela Reyes
*Assistant Examiner* — Fernando M Mari Valcarcel
(74) *Attorney, Agent, or Firm* — Greenblum & Bernstein P.L.C.

(57) ABSTRACT

Systems and methods for ingesting and enhancing data in a distributed processing framework. The system includes at least a data ingestion system configured to access data or datasets from one or more data sources. The data is accessed via the data ingestion system and includes metadata defining a plurality of attributes. The attributes are identified in the metadata, via the data ingestion system, and may be applied to the data or dataset for enhancing the data or dataset. Application of the attributes to the data results in enhancements that may include joining the data, enriching the data, or other enhancements accomplished via manipulation of the data via the data ingestion system.

20 Claims, 5 Drawing Sheets

METADATA DRIVEN COMBINED REAL-TIME AND BATCH DATA INGESTION FRAMEWORK WITH REAL-TIME MULTI-VIEW GENERATION

TECHNICAL FIELD

The present disclosure relates generally to data processing systems and methods of using the same.

BACKGROUND

Current practices for ingesting data in a distributed data framework, e.g., a Hadoop Data Framework, require implementation of different processes that utilize numerous tools that are a part of the distributed data framework's ecosystem. Each tool is provided to handle different types of data flows, and is configured for a specific use case. Configuring each tool requires specific coding in order for the tool to handle and process data. Due to the number of tools and the customization required for each tool, ingesting data via these practices is cumbersome and at times difficult to maintain and refactor. Additionally, time-to-market for the data (availability of the ingested data) is significantly impacted because of the need to implement multiple tools (solutions) to handle the data and such use cases. Furthermore, the total latency from data ingestion can be high for some of the existing tools, which limits real-time data availability. Accordingly, a need exists for a more efficient and reliable data ingestion system.

SUMMARY

These and other objects, features, and advantages of the present disclosure will become apparent from the following detailed description of illustrative embodiments thereof, which is to be read in connection with the accompanying drawings.

In an exemplary embodiment, a system for data ingestion in a distributed processing framework is provided. The system includes at least a computer readable memory including instructions stored thereon. The system further includes a processor in communication with the computer readable memory and configured to execute the instructions to perform one or more operation. The processor operations include accessing data from one or more data sources. The data includes metadata defining a plurality of attributes associated with the data. The processor operations also include identifying the plurality of attributes in the metadata, and calculating a derived attribute based on the plurality of attributes. The processor operations further include applying the derived attribute to the data to create enriched data, and generating a physical view of the enriched data.

BRIEF DESCRIPTION OF THE DRAWINGS

These and other features of the present disclosure will become better understood with regard to the following description and accompanying drawings in which.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other type of memory known to persons of ordinary skill in the art and having storing capabilities. The computing systems and devices may also utilize distributed cloud computing technologies to facilitate several functions, e.g., storage capabilities, executing program instruction, etc. The computing systems and devices may further include one or more communication components such as, for example, one or more network interface cards (NIC) or circuitry having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication know to persons of ordinary skill in the art and useful for facilitating the transfer of information.

Figure 1:
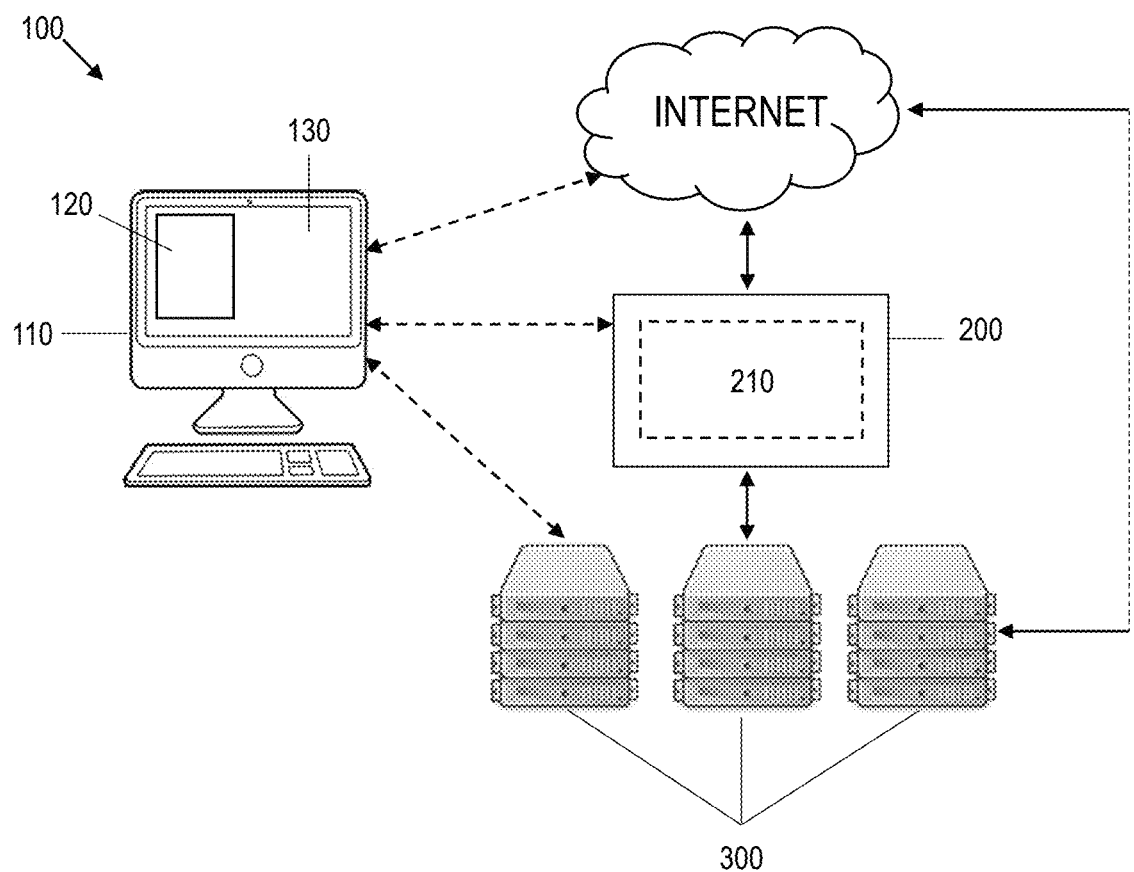
FIG. 1 illustrates an exemplary embodiment of a system in accordance with the disclosure provided herein.

Referring now to the drawings, which are for purposes of illustrating exemplary embodiments of the subject matter herein only and not for limiting the same, FIG. 1 shows an exemplary embodiment of a system 100 for ingesting data, which may be implemented in a processing network, e.g., a distributed processing network.

As shown in FIG. 1, the system 100 may include a user system or device 110, a data ingestion system 200, and one or more data sources 300. The user device 110, data ingestion system 200, and data sources 300 may be operably connected to each other via a direct communication link, remote communications link, or any communication link known to persons of ordinary skill in the art and configurable to allow for communication and/or interfacing between the one or more devices and components of the system 100. Examples of such communication links may include Local Area Networks (LAN), Wide Area Networks (WAN), and Global Area Networks (GAN) having wire or wireless branches, including, e.g., the Internet. Additionally, network devices/components and/or nodes (e.g., cabling, routers, switches, gateway, etc.) may also be included in the system 100 for facilitating the transfer of information within the system 100, and between at least the user device 110, the data ingestion system 200, and the data sources 300.

The user device 110 may be a personal computer or mobile device, e.g., notebook, tablet, or phone, which includes a user interface 120 configurable for acquiring one or more physical views generated or otherwise established, e.g., via the data ingestion system 200. The user interface 120 may further be configured for acquiring user information and providing data associated with the information, or the information as data, to the data ingestion system 200. Additionally, or alternatively, the data from the user device 110 may be a data request or a request for physical views from the data ingestion system 200. The physical views requested from the data ingestion system 200 may be provided to the user via a display 130 of the user device 110 or a display operably connected to the user device 110.

Figure 2:
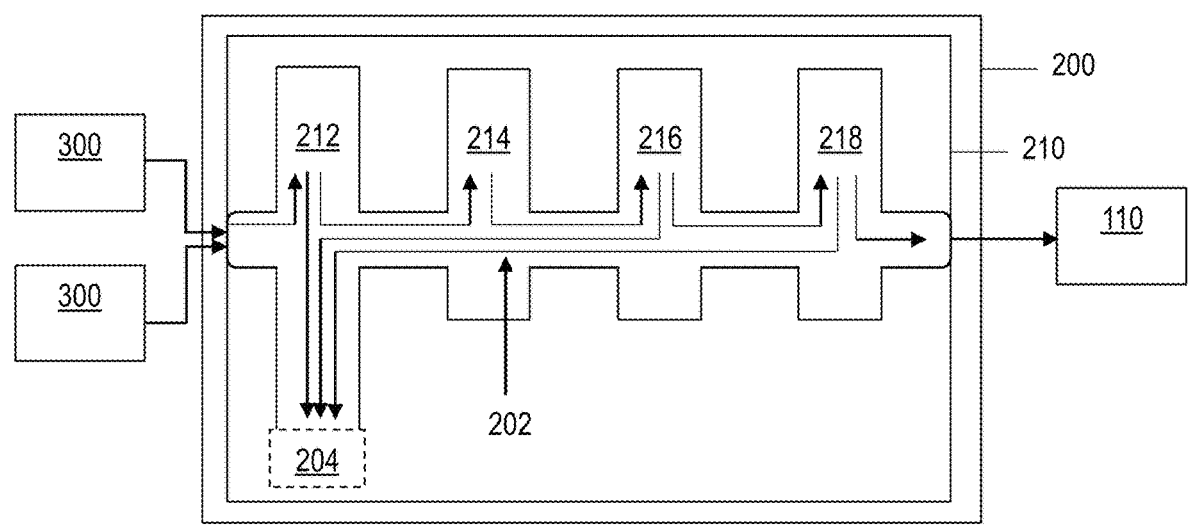
FIG. 2 illustrates an exemplary embodiment of a data ingestion system in accordance with the disclosure provided herein.

With continued reference to the figures, and now with additional reference to FIG. 2, in various embodiments, the data ingestion system 200 may be provided as software and/or in hardware, e.g., in a controller or server, and may be configured to ingest data from the data source 300 and provide to the user, e.g., via the user device 110. In an exemplary embodiment where the data ingestion system 200 is software, the data ingestion system 200 may reside in memory or other storage, e.g., on the user device 110 or data sources 300. The data ingestion system 200 as software may be executed via one or more processing circuits (also referred to herein as processor) operably configured to access the data ingestion system 200 as software. In an exemplary embodiment where the data ingestion system 200 is a controller or server, the data ingestion system 200 may include at least a processing circuit in signal communication with the memory storing, e.g., a data processing application, a network interface device for communicating with the other devices or systems in operable communication with the system 100, and a storage component/device for storing, temporarily or permanent, physical views, e.g., from the data ingestion system 200. The processor may be operable to execute a plurality of instructions from a means for ingesting data, e.g., a data ingestion engine or data processing application 210, which may be stored memory or other storage medium in communication with the data ingestion system 200.

With continued reference to the embodiment of FIG. 2, the data processing application 210 may include a plurality of instructions or modules that, when executed, cause the data ingestion system 200 to ingest data, and process the ingested data to provide physical views of the processed data. As shown in the exemplary embodiment of FIG. 2, the data processing application 210 may include instructions for accessing or otherwise receiving data, e.g., via an ingestion data module 212, from, e.g., the data sources 300. Each instance of data or a dataset flowing from the data source 300, may include metadata which may include one or more attributes associated with the data or the dataset. The data may flow from the data sources 300 through the ingestion data module 212 via a single path 202 (also referred to herein as a common path).

In some embodiments, e.g., the data processing application 210 may utilized a predefined data schema to transmit data. The data processing application 210 may be configured to follow one or more rules, e.g., defined in the data schema. The data schema may include all the required and/or optional attributes which may be transported to the data processing application 210, e.g., via the data flow.

Additionally or alternatively, the ingestion data module 212 may further be operable to validate the data ingested and normalize the data for further processing via the data ingestion system 200. In some embodiments, e.g., during data ingestion, data processing application 210 may be configured to validate incoming data by checking for any anomalies and/or missing attributes, which may be a required attribute.

Additionally, or alternatively, the data ingestion system 200 may further be configured to maintain data lineage back to the data source 300 and/or to a universal data dictionary (not shown). In some embodiments, e.g., the universal data dictionary may be a list of attributes and their definition. The definitions of the attributes may be defined at a macro level. It should be appreciated that providing the universal definition of each attribute may facilitate avoiding a duplication of an attribute and/or multiple interpretations of the attribute.

The data processing application 210 may further include instructions for accessing the metadata and determining a metadata type, i.e., the type of metadata included with the data, e.g., via a metadata processing module 214. The metadata processing module 214 may access or otherwise receive the data ingested via the ingestion data module 212. The metadata processing module 214 may be operable to identify information indicative of the metadata type in the metadata. For example, in an embodiment where the metadata type is a source type metadata, the metadata processing module may identify information associated with a source of the data or dataset, e.g., an entity name or other source identifying information, and information associated with a target for the data or dataset, e.g., a target directory, name or other target identifying information. Once the metadata type is determined, the metadata processing module 214 may organize the data or dataset by metadata type for further processing via the data ingestion system 200.

The data processing application 210 may further include instructions for identifying one or more configurations or attributes in the metadata, e.g., via an attribute processing module 216. In one exemplary embodiment, the attribute processing module 216 may be operable to identify the attributes by accessing information indicative of a specific attribute from the metadata, e.g., via the metadata processing module 214. The attribute processing module 216 may further be configured to organize the identified attributes, e.g., by attribute type, for further processing of the data via the data ingestion system 200. In some embodiments, e.g., the configurations may include parameters and/or instructions. The configurations may be used by data processing application 210 to identify or otherwise access attributes value from the data while ingesting data from upstream. In some embodiments, the attributes may be individual fields that make up and/or otherwise forms the data.

Upon accessing and identifying the specific attributes in the metadata, the attribute processing module 216 may be further operable to create or otherwise populate a derived attribute. In one exemplary embodiment, the derived attribute may be created via a calculation based on two or more of the specific attributes identified via the attribute processing module 216. The calculation may include combining two or more specific attributes to establish the derived attribute, or in yet a further exemplary embodiment, by applying at least one rule, e.g., a business defined rule or logic, to the specific attributes resulting in the derived attribute. In some embodiments, e.g., the derived attribute may be create via a custom/conditional logic.

In yet a further exemplary embodiment, the attribute processing module 216 may further be operable to manipulate the data ingested via the ingestion data module 212. To manipulate the data, the attribute processing module 216 may apply one or more of the derived attributes to the data, e.g., via the common path 202, to enrich the data. Application of the derived attributes may occur via the ingestion data module 212, or in a further exemplary embodiment, in a directory or bin 204 configured for storing or otherwise holding ingested data and/or processed data and accessible to one or more modules of the data ingestion system 200, e.g., the attribute processing module 216.

In some embodiments, e.g., the value for one or more of the attributes may be derived via a code logic. In other embodiments, the code logic may be used with or in place a mapping, e.g., a straight forward mapping, to LDM field. In some embodiments, the mapping may occur during the data ingestion phase. Additionally, or alternatively, a derived attribute may be used to derive additional attributes.

It should be appreciated that processing data via the common path 202 may provide scalability for data ingestion processes. In a further exemplary embodiment, processing data via the common path 202 may assist with preventing code duplication. In yet a further exemplary embodiment, processing data via the common path 202 may assist to with redundancy, e.g., via metadata for data persistence, which may add to the maintainability and/or stability of the system 100, including the ingesting and enhancing processes.

In some embodiments, e.g., the common path 202 may allow for batch data processing and real-time (or near real-time) data processing via a similar and/or a same methodology utilized for preventing duplicate codes. It should be appreciated that single path processing may ensure consistent data output.

Additionally, or alternatively, the manipulation of the data may be via a joining or uniting process. Joining the data may include combining the ingested data with additional data (or combining two or more datasets) into a single unified data model. Combining the ingested data with the additional data may be accomplished by identifying the attributes in the data and additional data, and determining if the data and additional data share or otherwise have one or more common attributes. The common attributes may be an indication that the data and additional data can be combined during the joining process. Additionally, or alternatively, a further indication that the data and additional data can be joined may be determined or otherwise identified by the metadata type, e.g., metadata to join data.

Figure 4:
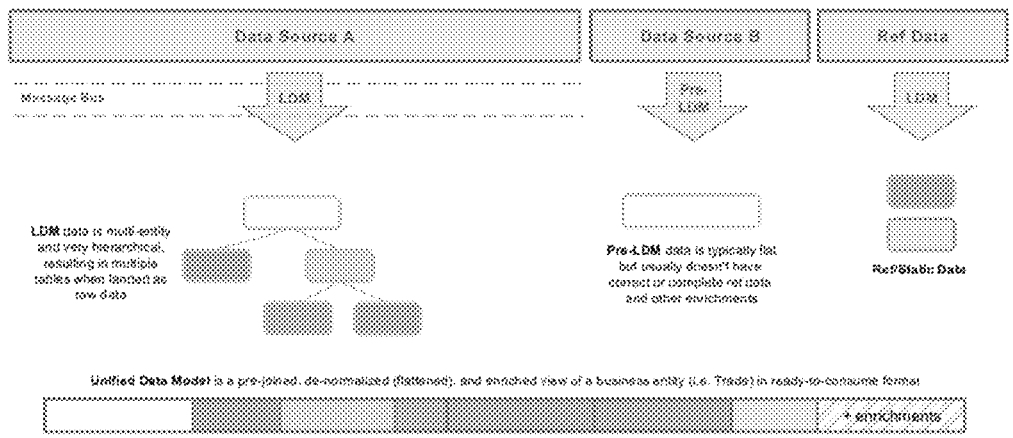
FIG. 4 illustrates an exemplary embodiment of a process flow chart in accordance with the disclosure provided herein.

In some embodiment, e.g., joining of the data may take include processing and/or analyzing various data versions. Additionally, or alternatively, in cases where multiple datasets may be joined, a chained relationship may be established. In some embodiments, e.g., the chained relationship may be between datasets. In some embodiments, e.g., joining of the dataset may include multiple level of common attributes With reference now to FIG. 4, an exemplary embodiment of a process flow chart is provided. In some embodiment, e.g., a logical data model (LDM) may be provided. The LDM may be a hierarchical/normalized data structure that complies to one or more logical data model definition. In some embodiments, e.g., a Pre-LDM may be provided. The Pre-LDM may be unstructured 2-dimensional data. Additionally, or alternatively, a unified data model (UDM) may be provided, and may be a user defined data model. The UDM may be used, e.g., for use cases, e.g., a well-defined use case, such as reporting or client service use casees. In some embodiments, e.g., the UDM may be generated via de-normalization of one or more LDMs.

Figure 5:
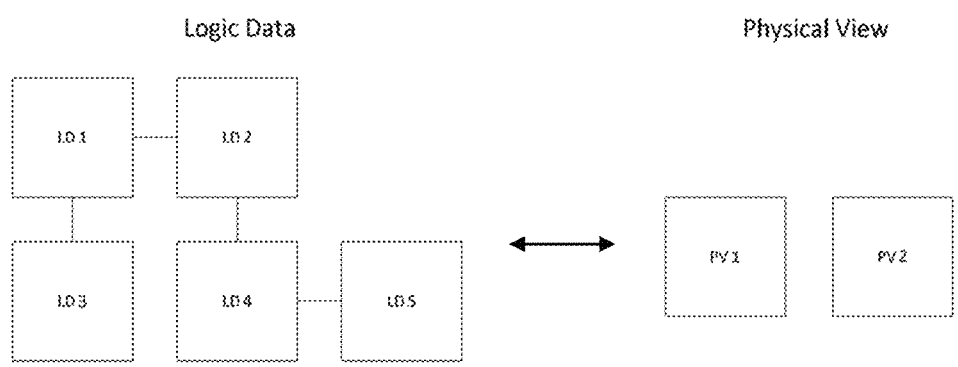
FIG. 5 illustrates an exemplary embodiment of a physical view in accordance with the disclosure provided herein.

With continued reference to the figures, and now with reference to FIG. 5, the data ingestion system 200 may further include instructions for creating or otherwise generating one or more physical views of the data and datasets, and/or manipulated data and datasets, e.g., via a view processing module 218. In some embodiments, the physical view of data may be derived from a combination of one or more logical data.

It should be appreciated that the generated physical views may present the data with any joins, unions, enrichments, or other enhancements provided via the data ingestion system 200. To generate physical views of the data or dataset, the view processing module 218 may be operable to access the enhanced data, e.g., via the ingestion data module 212 or bin 204. The view processing module 218 may further be operable to map the data along with the enhancements, e.g., any joins, unions, enrichments, to a physical depiction of the data illustrating, e.g., the enhancements as well as a data lineage back to the data source 300, and/or the universal data dictionary.

In some embodiments, e.g., the physical view may be created during the ingestion phase, and may involve the joining of multiple data. The process may include and or utilize an event driven architecture, where upon receiving any dataset, the event driven architecture may trigger the process to start collecting the dataset, e.g., any necessary datasets, and may apply a configuration to generate, e.g., a unified data and/or a persist data as a physical view.

With continue reference to the figures, the data source 300 may be a system or platform which may be operably configured to provide or otherwise make accessible data or datasets to the data ingestion system 200. The exemplary embodiment of FIG. 2 illustrates two data sources 300 with data flowing through the data ingestion system 200, via the common path 202. The data sources 300 may include, e.g., a batch data source, a real-time data source, a reference data source, or a static data source. Additionally, or alternatively, the data sources 300 may be a mixture or combination of the batch data source, the real-time data source, the reference data source, and/or the static data source. The batch data source may be operably configured to provide data which may be consolidated and published or otherwise applied, e.g., once a day, usually at the end of the day. The real-time data source data source may be operably configured to provide data which may be published or otherwise applied in real-time or near real-time throughout the day as activities occur. The reference data source and the static data source may be operable configured to provide attributes, e.g., additional attributes, for joining, uniting, or enriching the ingested data, or for creating derived attributes.

Additionally, or alternatively, data flowing from the data sources 300 may be event drive, e.g., in a push data model, and/or query based, e.g., in a pull data model. It should be appreciated that regardless of the data delivery mechanism, e.g., the real-time, batch, push, or pulled data delivery mechanism, the ingested data may be mapped into multiple data views. Each of the data views may also be optimized for various query access patterns.

In some embodiments, e.g., the data views may be optimized based on the data access pattern. Additionally, or alternatively, the data may be stored sorted in a manner that the data would be access. In some embodiments, the data may also be partitioned to provide simultaneous data search.

Figure 3:
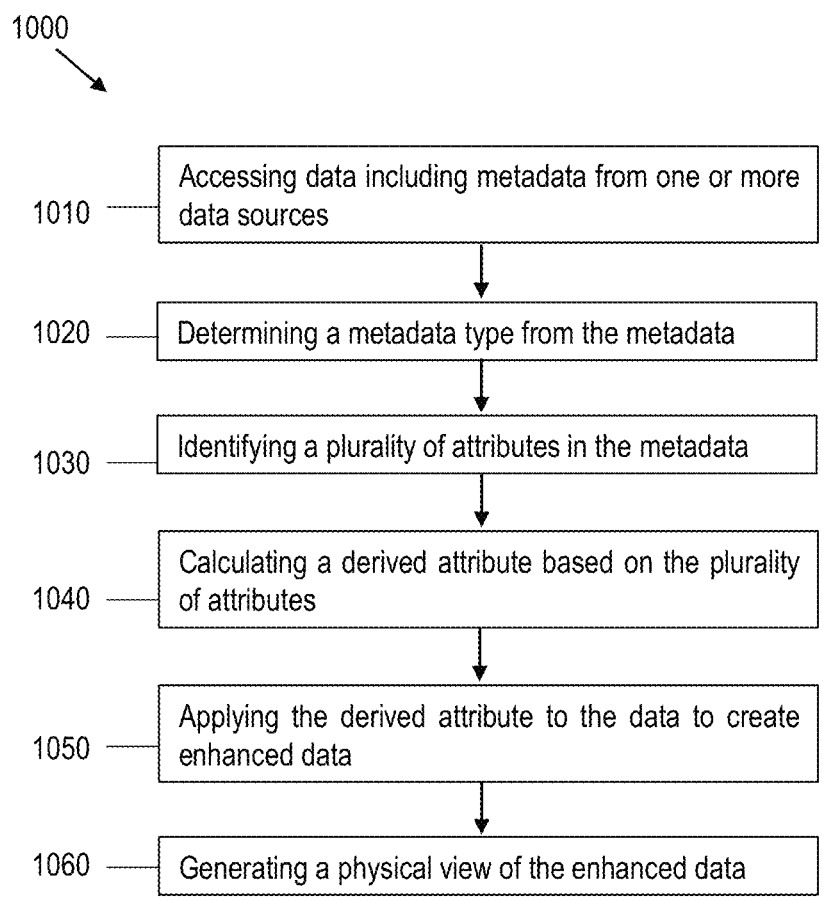
FIG. 3 illustrates a flowchart for an exemplary embodiment of a method in accordance with the disclosure provided herein.

With continued reference to the figures, and now with reference to FIG. 3, a method 1000 for ingesting data in a distributed processing framework is provided. It should be appreciated that the method 1000 may be performed in a different order, with illustrated steps omitted, with additional steps added, or with a combination of reordered, combined, omitted, or additional steps.

In step 1010, accessing data from one or more data sources 300, e.g., via a common path 202. The data may include metadata defining a plurality of attributes associated with the data and/or the data source 300.

Upon accessing the data, in step 1020, a metadata type may be determined. The metadata type may be determined based on information identified in the metadata.

In step 1030, the attributes may be identified in the metadata.

Once the attributes have been identified, in step 1040, a derived attribute may be created or otherwise generated. The derived attribute may be based on a calculation or derivation of two or more of the identified attributes.

In step 1050, the derived attribute may be applied to the ingested data to create an enhanced (enriched) data. Application of the attributes to the ingested data may be achieved via the common path 202.

Additionally, or alternatively, where the desired data enhancement includes enhancements by joining, union, or other enhancement resulting from manipulating the data, steps 1040 and/or 1050 may include the enhancement process, e.g., the joining or union process, or other process for enhancing the data.

In step 1060, one or more physical views of the enhanced data may be created or otherwise generated. The physical view may include at least the data along with any enhancements. Additionally, or alternatively, the physical view may illustrate the enhanced data's lineage back to, e.g., the data source 300, and/or the universal data dictionary.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps; and the use of articles "a" or "an" does not exclude a plurality.

We claim:

1. A system for data ingestion in a distributed processing framework and for displaying a physical view of enriched data identifying the physical storage device or devices storing the enriched data comprising:
   a user device having a display configured to display a user interface and configured to acquire and display one or more physical views of enriched data identifying the physical storage device or devices storing the enriched data;
   a data ingestion system
      a) configured to receive a request transmitted from the user device to transmit to the user device the one or more physicals views of the enriched data identifying the physical storage device or devices storing the enriched data to the user device over a network, and
      b) configured to transmit the one or more physical views of the enriched data identifying the physical storage device or devices storing the enriched data to the user device in response to receiving the request from the user device; and
   one or more data sources configured to transmit data including metadata defining a plurality of attributes associated with the data to the data ingestion system over the network;
   wherein the data ingestion system includes
      a computer readable memory including instructions stored thereon;
      a common path, directly connected to the one or more data sources and configured to directly receive the data transmitted from the one or more data sources; and
      a processor in communication with the computer readable memory and configured to execute the instructions to perform at least the following operations:
         accessing, with an ingestion module directly connected to the common path, the data from the one or more data sources including the metadata defining the plurality of attributes associated with the data, wherein the metadata comprises source metadata identifying the source of the data;
         identifying, with a metadata processing module directly connected to the common path without passing through the ingestion module, the plurality of attributes in the metadata identifying the source of the data;
         calculating, with an attribute processing module directly connected to the common path without passing through the ingestion module, a derived attribute of the metadata identifying the source of the data based on the plurality of attributes;
         applying, with the attribute processing module directly connected to the common path without passing through the ingestion module, the derived attribute of the metadata identifying the source of the data to the data to create the enriched data;
         generating, with a view processing module directly connected to the common path without passing through the ingestion module, the physical view of the enriched data identifying the physical storage device or devices storing the enriched data and created from applying the derived attribute of the metadata identifying the source of the data to the data; and
         transmitting the physical view of the enriched data, identifying the physical storage device or devices storing the enriched data, to the user device for display of the physical view of the enriched data identifying the physical storage device or devices storing the enriched data on the user interface of the display of the user device,
      wherein the user device displays on the display the physical view of the enriched data, identifying the physical storage device or devices storing the enriched data, created from applying the derived attribute of the metadata identifying the source of the data to the data on the user interface thereof in response to receiving the physical view of the enriched data, identifying the physical storage device or devices storing the enriched data, transmitted from the data ingestion system, and
      wherein the common path is configured to directly receive the data transmitted from the one or more data sources without passing through the ingestion module.

2. The system of claim 1, wherein the one or more data sources include a batch data source and a real-time data source.

3. The system of claim 2, wherein the data from the batch data source and the real-time data source is accessed via the common path.

4. The system of claim 3, wherein the processor is further configured to perform the operation: validating and normalizing the data through the common path.

5. The system of claim 3, wherein applying the derived attribute to the data is through the common path.

6. The system of claim 1, wherein the processor is further configured to perform the operation:
determining a metadata type from the metadata, wherein the metadata type is a source type metadata including information indicative of a source for the data and a target for the data, and wherein the data is mapped to a source output module based on a common source, and a target output module based on a common target.

7. The system of claim 1, wherein calculating the derived attribute includes combining multiple attributes into the derived attribute.

8. The system of claim 1, wherein the one or more data sources include a static data source, a batch data source, and a real-time data source, wherein the data from each of the static data source, the batch data source, and the real-time data source is accessed via the common path; wherein identifying the plurality of attributes in the metadata includes identifying the attributes from the static data source's metadata; and wherein the attributes identified from the static data source's metadata are used for calculating the derived attribute.

9. The system of claim 1, wherein
the processor is configured to prevent code duplication via the common path using the same methodology used for batch data processing and real-time data processing, and
the common path is configured to allow the batch data processing and the real-time data processing using the same methodology used to prevent code duplication.

10. A method for ingesting data in a distributed processing framework and for displaying a physical view of enriched data identifying the physical storage device or devices storing the enriched data comprising:
providing a user device having a display configured to display a user interface and configured to acquire and display one or more physical views of enriched data identifying the physical storage device or devices storing the enriched data;
providing a data ingestion system having a computer readable memory storing instructions therein, a common path, directly connected to the one or more data sources and configured to directly receive the data transmitted from the one or more data sources, and a processor configured to execute the instructions, the system
a) configured to receive a request transmitted from the user device to transmit to the user device the one or more physicals views of the enriched data identifying the physical storage device or devices storing the enriched data to the user device over a network, and
b) configured to transmit the one or more physical views of the enriched data identifying the physical storage device or devices storing the enriched data to the user device in response to receiving the request from the user device; and
providing one or more data sources configured to transmit data including metadata defining a plurality of attributes associated with the data to the data ingestion system over the network;
accessing, with an ingestion module directly connected to the common path, the data from the one or more data sources including the metadata defining a plurality of attributes associated with the data, wherein the metadata comprises source metadata identifying the source of the data;
identifying, with a metadata processing module directly connected to the common path without passing through the ingestion module, the plurality of attributes in the metadata identifying the source of the data;
calculating, with an attribute processing module directly connected to the common path without passing through the ingestion module, a derived attribute of the metadata identifying the source of the data based on the plurality of attributes;
applying, with the attribute processing module directly connected to the common path without passing through the ingestion module, the derived attribute of the metadata identifying the source of the data to the data to create the enriched data;
generating, with a view processing module directly connected to the common path without passing through the ingestion module, the physical view of the enriched data identifying the physical storage device or devices storing the enriched data and created from applying the derived attribute of the metadata identifying the source of the data to the data; and
transmitting the physical view of the enriched data, identifying the physical storage device or devices storing the enriched data, to the user device for display of the physical view of the enriched data identifying the physical storage device or devices storing the enriched data on the user interface of the display of the user device,
wherein the user device displays on the display the physical view of the enriched data, identifying the physical storage device or devices storing the enriched data, created from applying the derived attribute of the metadata identifying the source of the data to the data on the user interface thereof in response to receiving the physical view of the enriched data, identifying the physical storage device or devices storing the enriched data, transmitted from the data ingestion system, and
wherein the common path is configured to directly receive the data transmitted from the one or more data sources without passing through the ingestion module.

11. The method of claim 10, wherein the one or more data sources include a batch data source and a real-time data source.

12. The method of claim 11, wherein the data from the batch data source and the real-time data source is accessed via the common path.

13. The method of claim 12, further comprising:
validating and normalizing the data through the common path.

14. The method of claim 10, further comprising:
determining a metadata type from the metadata, wherein the metadata type is a source type metadata including information indicative of a source for the data and a target for the data.

15. The method of claim 14, wherein the determining the metadata type further comprises: mapping the data to a source output module based on a common source as indicated by the source for the data and to a target output module based on a common target as indicated by the target for the data.

16. The method of claim 10, wherein the calculating the derived attribute comprises: combining multiple attributes into the derived attribute.

17. The method of claim 10, wherein the one or more data sources include a static data source, a batch data source, and a real-time data source, wherein the data from each of the static data source, the batch data source, and the real-time data source is accessed via the common path; wherein the identifying the plurality of attributes in the metadata includes identifying the attributes from the static data source's metadata; and wherein the attributes identified from the static data source's metadata are used for calculating the derived attribute.

18. The method of claim 10, wherein the physical view presents the data along with any joins, unions, enrichments, or derivations based on the metadata type.

19. A system for data ingestion in a distributed processing framework and for displaying a physical view of enriched data identifying the physical storage device or devices storing the enriched data comprising:
 a user device having a display configured to display a user interface and configured to acquire and display one or more physical views of enriched data identifying the physical storage device or devices storing the enriched data;
 a data ingestion system
  a) configured to receive a request transmitted from the user device to transmit to the user device the one or more physicals views of the enriched data identifying the physical storage device or devices storing the enriched data to the user device over a network, and
  b) configured to transmit the one or more physical views of the enriched data identifying the physical storage device or devices storing the enriched data to the user device in response to receiving the request from the user device; and
 first and second data sources configured to transmit data including metadata defining a plurality of attributes associated with the data to the data ingestion system over the network;
 wherein the data ingestion system includes
  computer readable memory including instructions stored thereon;
  a common path, directly connected to the one or more data sources and configured to directly receive the data transmitted from the one or more data sources; and
  a processor in communication with the computer readable memory and configured to execute the instructions to perform at least the following operations:
   accessing, with an ingestion module directly connected to the common path, the data from the first data source and the second data source via a common path, wherein the data from both the first data source and the second data source includes metadata defining a plurality of attributes, wherein the metadata comprises source metadata identifying the source of the data;
   identifying, with a metadata processing module directly connected to the common path without passing through the ingestion module, the plurality of attributes in the metadata of the both the first data source and the second data source identifying the source of the data;
   determining, with an attribute processing module directly connected to the common path without passing through the ingestion module, if one or more attributes from the metadata identifying the source of the data from the first data source is common to one or more of attributes from the metadata identifying the source of the data from the second data source;
   enhancing, with the attribute processing module, the data from the first data source with the attributes of the metadata identifying the source of the data from the second data source via the common path;
   generating, with a view processing module directly connected to the common path without passing through the ingestion module, the physical view of the enhanced data identifying the physical storage device or devices storing the enriched data from the first data source created by applying the attributes of the metadata identifying the source of the data from the second data source via the common path to the first data source;
   transmitting the physical view of the enhanced data, identifying the physical storage device or devices storing the enriched data, to the user device for display of the physical view of the enhanced data identifying the physical storage device or devices storing the enriched data on the user interface of the display of the user device,
   wherein the user device displays on the user interface of the display the physical view of the enhanced data, identifying the physical storage device or devices storing the enriched data, created by applying the attributes of the metadata identifying the source of the data from the second data source via the common path to the data of the first data source in response to receiving the physical view of the enhanced data, identifying the physical storage device or devices storing the enriched data, transmitted from the data ingestion system, and
   wherein the common path is configured to directly receive the data transmitted from the first and second data sources without passing through the ingestion module.

20. The system of claim 19, wherein
 the processor organizes the identified attributes of the metadata by attribute type for further processing of the metadata,
 the processor identifies the plurality of attributes of the metadata while accessing and ingesting the data from the one or more data sources including the metadata,
 the system further includes a directory or bin configured to hold the accessed data from the one or more data sources including the metadata, and the applying of the derived attribute of the metadata identifying the source of the data to the data to create the enriched data occurs in the directory or bin,
 the processor derives a value of the identified attributes of the metadata via a code logic,
 the processor uses code logic instead of mapping to associate the accessed data from the one or more data sources included the metadata to a source output module and to a target output module,
 the processor uses the calculated derived attribute to derive additional attributes of the metadata,
 the processor accesses data from the data sources, and validates and normalizes the accessed data through the common path, and prevents code duplication via the common path, the processor determines whether the data and the derived attribute are joinable by determining whether the type of metadata of the accessed data is metadata that is joinable to the accessed data, the processor derives the physical view of the enriched data from a combination of logical views of the enriched data, the processor generates the enriched data by joining the accessed data to derived metadata, and displays the enriched data with such joins, the processor generates and displays the enriched data by mapping the accessed data with the derived metadata to a physical depiction of
the enriched data,
the derived metadata, and
data lineage back to the source of the accessed data and a universal data dictionary, the processor generates the physical view during the accessing the data from the one or more data sources, and the processor generates the physical view during the accessing the data from the one or more data sources using an event driven architecture, which upon receiving the accessed data from the data sources, generates the physical view.

\* \* \* \* \*